(12) United States Patent
Groel et al.

(10) Patent No.: US 6,359,751 B1
(45) Date of Patent: Mar. 19, 2002

(54) AUTOMATIC CLEANING DEVICE FOR MAGNETIC RECORDING HEAD

(75) Inventors: Peter L. Groel; Philip M. McClelland, both of Longmont, CO (US)

(73) Assignee: Mountain Engineering II. Inc., Longmont, CO (US)

( * ) Notice: Subject to any disclaimer, the term of this patent is extended or adjusted under 35 U.S.C. 154(b) by 0 days.

(21) Appl. No.: 09/505,136

(22) Filed: Feb. 16, 2000

(51) Int. Cl.[7] .................................................. G11B 5/41
(52) U.S. Cl. ........................................................ 360/128
(58) Field of Search ................................. 360/128, 137

(56) References Cited

U.S. PATENT DOCUMENTS

| | | | |
|---|---|---|---|
| 3,964,104 A | 6/1976 | Herron et al. | 360/128 |
| 4,165,526 A | 8/1979 | Jones | 360/137 |
| 4,704,647 A | 11/1987 | Hino | 360/128 |
| 5,136,448 A | 8/1992 | Kiriyama et al. | 360/128 |
| 5,335,128 A | 8/1994 | Morinaka | 360/128 |
| 5,386,333 A | 1/1995 | Kang et al. | 360/128 |
| 5,453,894 A | 9/1995 | Kim et al. | 360/128 |
| 5,701,224 A | 12/1997 | Sakui | 360/128 |
| 5,793,580 A | 8/1998 | Argumedo et al. | 360/128 |
| 5,859,755 A | 1/1999 | Griffin et al. | 360/128 |
| 5,930,089 A | 7/1999 | Anderson | 360/128 |
| 5,991,127 A | 11/1999 | Thiessen | 360/128 |
| 6,043,949 A | * 3/2000 | Sakui | 360/69 |
| 6,067,211 A | * 5/2000 | Chliwnyj et al. | 360/128 |
| 6,212,035 B1 | * 4/2001 | Maule | 360/128 |
| 6,215,618 B1 | * 4/2001 | Anderson et al. | 360/128 |
| 6,252,739 B1 | * 6/2001 | Todd et al. | 360/128 |

FOREIGN PATENT DOCUMENTS

| | | | |
|---|---|---|---|
| JP | 9-7131 | * | 1/1997 |
| JP | 11-328635 | * | 11/1999 |

* cited by examiner

*Primary Examiner*—Jefferson Evans
(74) *Attorney, Agent, or Firm*—Rick Martin; Patent Law Offices of Rick Martin P.C.

(57) ABSTRACT

A cleaning device for a magnetic recording system that is mechanically actuated by a link to a loading device. A method of cleaning the recording head of a magnetic tape drive by bringing a brush into contact with the head by the movement of the loading device and by using the head actuator to move the head against the brush. A method to dynamically adjust the duration of the cleaning to the contamination.

10 Claims, 6 Drawing Sheets

AUTOMATIC CLEANING DEVICE FOR MAGNETIC RECORDING HEAD

FIELD OF INVENTION

The present invention relates to a cleaning device for magnetic recording tape drives and, more specifically, to a mechanically actuated head cleaner for small size linear magnetic recording cartridge tape drives.

BACKGROUND OF THE INVENTION

In magnetic tape drives the recording media is moved from a supply spool in a tape cartridge to a take-up spool on the tape drive across a head that holds the recording and read-back elements. When the tape cartridge is to be removed the tape is rewound back onto the supply spool. The path of the tape is defined by guiding elements including rollers, hydrodynamic bearings, hydrostatic bearings, and other similar components. In prior art systems with hydrodynamic bearings an air pump to pressurize the bearings is also needed. Pressurized bearings separate the tape from the bearings by a thin film of air, reducing wear on the tape and extending tape life.

The tape must also be maintained above the head a given height. The distance of the tape from the head, known as the "flying height", must be precisely controlled during recording and read-back of data. The ability to record and read-back data is lost if the flying height exceeds certain limits. In the older systems the air pump supplies pressurized air through an electrically activated valve to the surface of the recording head to separate the tape from the head when the movement of the tape is stopped. The airflow is turned on when tape movement is stopped, as well as when tape is accelerated or decelerated. When tape movement is at normal speed the pressurized air is turned off because the movement of the tape generates a thin film of air that separates the tape and the recording surface. Slots in the surface of the recording head are used to bleed off excessive air so that the separating air film is kept thin.

In operation the tape is moved past the head and data is encoded on to the tape. All heads have a writing portion and a reading portion immediately following. The reading portion reads the data just written on the tape and compares it to the original data to check for errors. All drives have built in microprocessors to check the error rate. The microprocessor will generally send an error message to the operator when a set error rate is exceeded so that the head can be cleaned.

The recording portion of the head is not writing on the whole width of the tape, only a fraction of the width is used in any one pass of the tape across the head. The head can move laterally back and forth across the width of the tape to allow the head to write on a given fraction of the width of the tape. The controls of the tape drive move the tape backward and forward as the head moves, resulting in the data being deposited in a serpentine path on the tape.

Although there are many different types of tape drives on the market they all have some common characteristics. In response to the requirements of the users, tape drives are becoming smaller, less costly, and they store increasing amounts of data. Air pumps and filters are too large and expensive to be used in the new, smaller tape drives.

Today even high-end tape drive manufacturers can no longer afford air pumps. Without the aid of pressurized air, the air-film above the surface of the recording head collapses when tape decelerates from the nominal speed during a stop operation. The tape then comes in direct contact with the head while the tape is still moving. Similarly, at the beginning of a start operation the tape starts to move while still in direct contact with the head. This contact with the head results in increased debris on the head as loose particles are scraped off the tape and deposited on the head.

Contamination of the head is undesirable for two reasons. First, when debris collects in the above-described slots in the head the air generated by the movement of the tape can no longer move away from the surface. The flying height increases and the ability to record or read back data is lost. Second, because of the increased recording density of modern systems, even small particles of debris on the tape will result in data errors. As the tape comes in contact with the head the debris can be transferred to the tape, increasing the number of errors.

A number of patents have addressed the issue of cleaning either the recording media or the head. A number of them are discussed herein. Most prior art patents relate to helical scan recorders where a recording head is mounted on a rotary drum. U.S. Pat. Nos. 5,335,128; 5,386,333; 5,453,894 and 5,701,224 all describe a mechanism that moves a cleaning roller to the spinning head. U.S. Pat. No. 4,704,647 uses a pad instead of a roller, while U.S. Pat. No. 3,964,104 uses a rotary brush. These mechanisms can be effective in removing debris from the surface of a spinning head, but they cannot remove debris from a head in a linear tape drive containing grooves.

A means to remove debris from the tape itself is disclosed in U.S. Pat. Nos. 4,165,526 and 5,136,448. Other prior art discusses cartridges containing a special cleaning tape. U.S. Pat. Nos. 5,859,755 and 5,991,127 illustrate a cleaning tape that moves through the tape path and removes contamination from tape path components.

Cleaning cartridges and tape cleaners are successful in slowing down the buildup of debris in the head grooves, but these cleaning cartridges cannot entirely remove all the debris. Manual cleaning operations of the head by an operator are still required.

Several patents have attempted to address this problem by providing for automatic head cleaning devises. U.S. Pat. No. 5,930,089 discloses a mechanism that displaces the tape and moves a brush to the recording head. The cleaning operation is performed without removal of the data tape. The brush has totally separate components from the rest of the drive components to move the brush to the head. The normal operator finds any disruption of the recording process for cleaning purposes undesirable as this increases the time required for each back up operation. In addition, cleaning the head while the tape is next to the head increases the change that the tape will get dirty, necessitating cleaning the tape also. A preferred cleaning device would be able to clean the head sufficiently before a tape is loaded for an operation of the drive.

A mechanically actuated cleaning device that moves a brush across the head surface twice whenever a cartridge is loaded or unloaded is described in U.S. Pat. No. 5,793,580. The number of cycles performed during a cleaning operation is a function of the mechanical parts and therefore cannot be modified. Two cycles is a low number as debris on the head can at times be difficult to remove.

A device that can periodically thoroughly clean the head surface, including any slots in the surface, is needed. Due to the size and cost restrictions of the newer tape drives, such a device should not require any electrical circuits or actuators such as solenoids or motors. The device needs to be able to adjust the amount of cleaning based on the condition of the head. The present invention solves these problems by providing an automatic device to move a brush up to the head every time the tape cartridge is removed from the tape drive. The head is then moved against the brush using the head actuator, cleaning the head.

SUMMARY OF THE INVENTION

The primary aspect of the present invention is to provide an automatic device to clean the recording head of a tape drive.

Another aspect of the present invention is to provide a device that will adjust the amount of cleaning operations done on the recording head according to the state of the head.

Another aspect of the present invention is to provide an automatic head cleaner for a tape drive with the minimum necessary additional parts.

Other aspects of this invention will appear from the following description and appended claims, reference being made to the accompanying drawings forming a part of this specification wherein like reference characters designate corresponding parts in the several views.

The present invention provides a mechanically actuated cleaning device for a linear magnetic tape drive that uses a tape cartridge. The tape drive consists of at least six elements: a recording head, an actuator attached to the head that moves the recording head across the width of the tape, a take-up hub, a supply hub, a mechanism to load the tape cartridge onto the supply hub, and a cleaning device.

The cleaning device contains at least three components: a brush, a housing for the brush, and a link to the loading device. The housing is attached through a mechanical link to the loading mechanism in such a manner that the brush is moved into contact with the head as the cartridge is removed from the take-up hub. When a cartridge is loaded onto the take-up hub, the motion of the loading device is used to shift the cleaning device away from the head to allow the tape to be moved across the surface of the head. The cleaning operation is performed after the cartridge is unloaded and before the next cartridge is loaded. The head actuator, normally used to access different areas of the tape, moves the head up and down several times while the brush is pushed against the head. Thus, debris is removed from the head. The number of cycles the head moves can easily be modified to fit the requirements. For example, if the number of bit errors after a write operation indicates a contaminated head, the number of cleaning cycles may be increased. A typical number is 10 to 16 cycles for normal operation, 24 to 32 cycles for highly contaminated heads.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
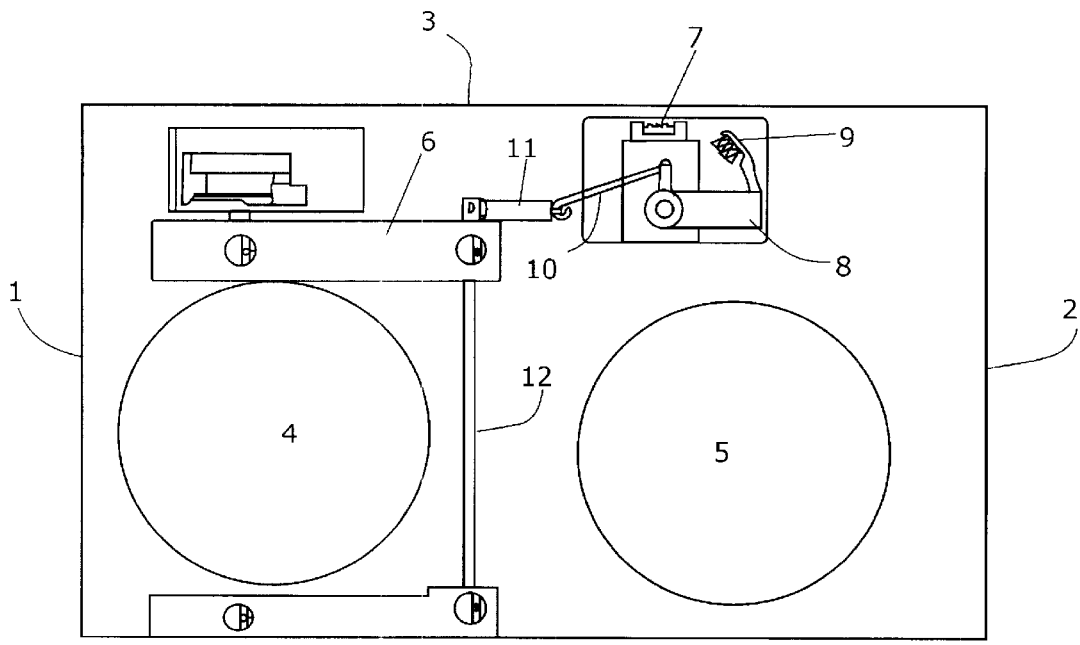
FIG. 1 is a bottom plan view of a tape drive of the present invention with the supply and take-up reels not shown.
Figure 2:
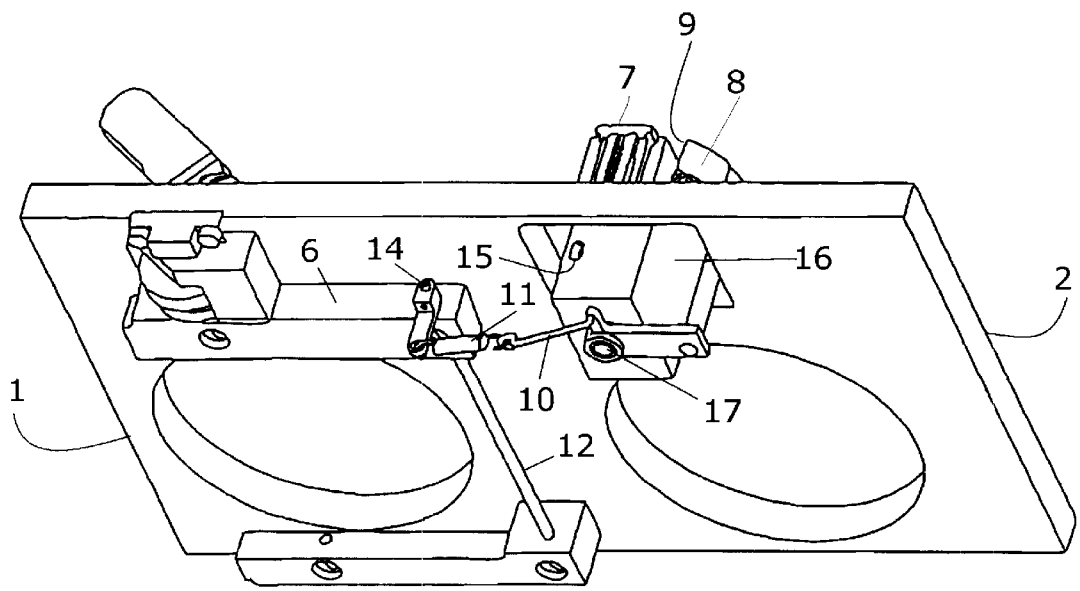
FIG. 2 is a bottom perspective view of the tape drive of the present invention.
Figure 3:
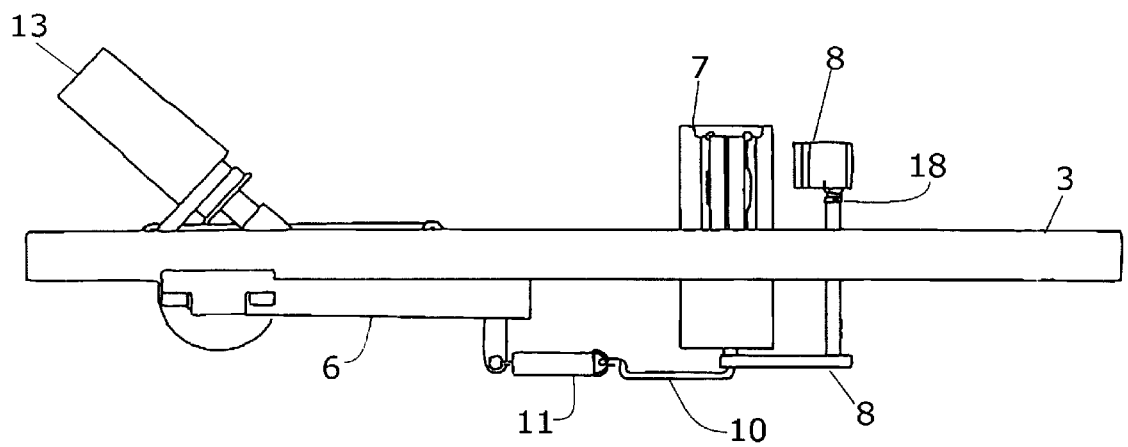
FIG. 3 is a side perspective view of the present invention.

Referring first to FIGS. 1, 2 and 3, the tape receiving part of the tape drive is shown. A plate 3 with a front 1 and a back 2 is used to mount the drive components. Circular openings 4 and 5 are provided for the supply and the take-up reel respectively (not shown). Motor 13 actuates a loading device 6. The details of the loading device that do not relate to the present invention are not shown, as they are well known in the art.

A shaft 12 rotates in a counter-clockwise direction during a load operation and in a clockwise direction during an unload operation as part of the prior loading device 6. A carrier 8 for a brush 9 is attached to a mounting block 16. This mounting block 16 contains the recording head and read-back head 7 and the head actuator (not shown). The link between the shaft 12 of loading device 6 and the carrier 8 consists of three parts an arm 14, a spring 11 and a rod 10. One end of the arm 14 is attached to the shaft 12. The other end is attached to a first spring 11. When the shaft rotates in clockwise direction during an unload operation the end of the arm 14 attached to the spring 11 moves toward the front 1 of the tape drive and pulls the spring 11 and rod 10. This in turn causes the carrier 8 to pivot around a pivot point 17 attached to mounting block 16. Block 15 stops the movement of the carrier 8 when the brush 9 is aligned with the head 7. The spring 11 allows the shaft 12 to continue rotating until the unloading operation is completed.

The cleaning operation is performed by the head's actuator (not shown), which moves the head 7 up and down against the brush 9 repeatedly. A second spring 18 pushes the brush 9 against the head 7 with the desired force. The same microprocessor noted above which monitors the error rate can be programmed to control the number of times the head 7 is moved against the brush 9. The higher the error rate the microprocessor notes, the more cleaning cycles can be preformed. A set number of cleaning cycles can be set for every time a tape is unloaded to maintain the head 7 in good condition.

Figure 4:
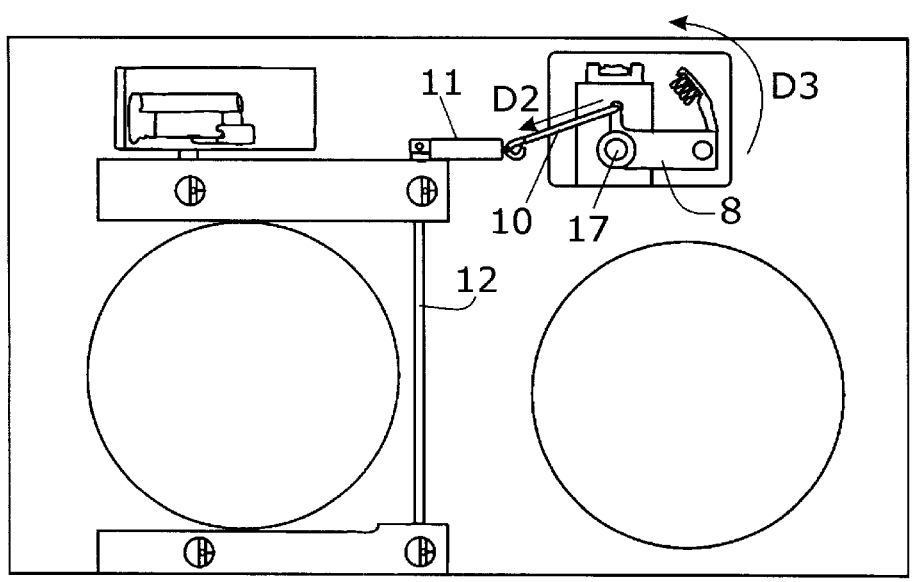
FIGS. 4, 5 and 6 are a bottom plan view of the movement of the brush during an unload cycle of the first embodiment.
Figure 5:
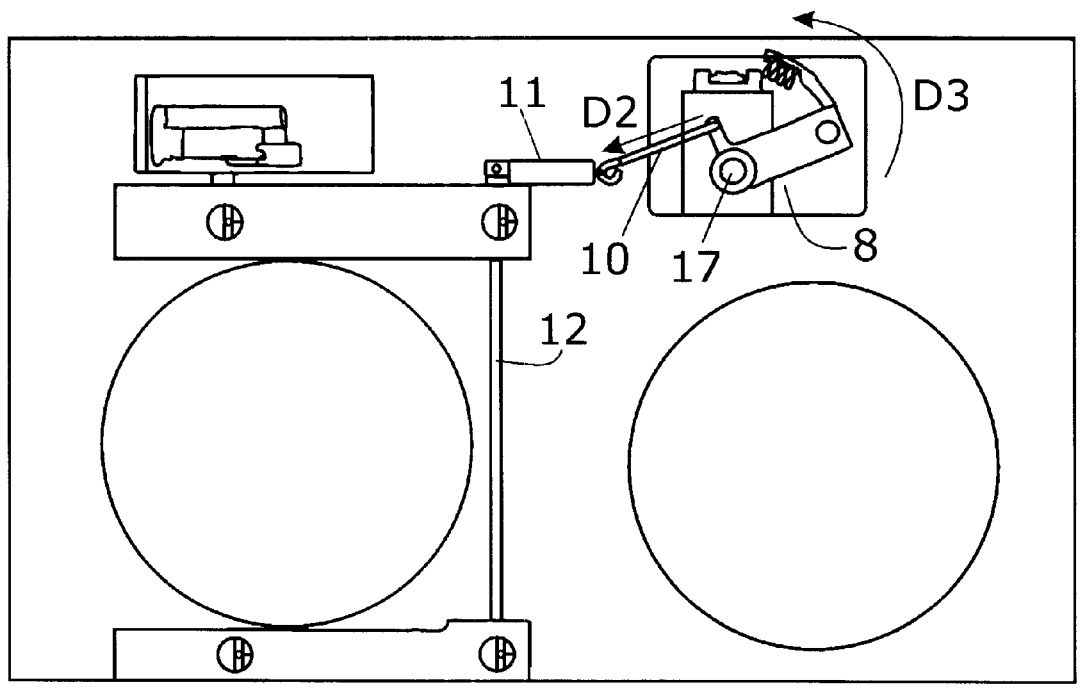
Figure 6:
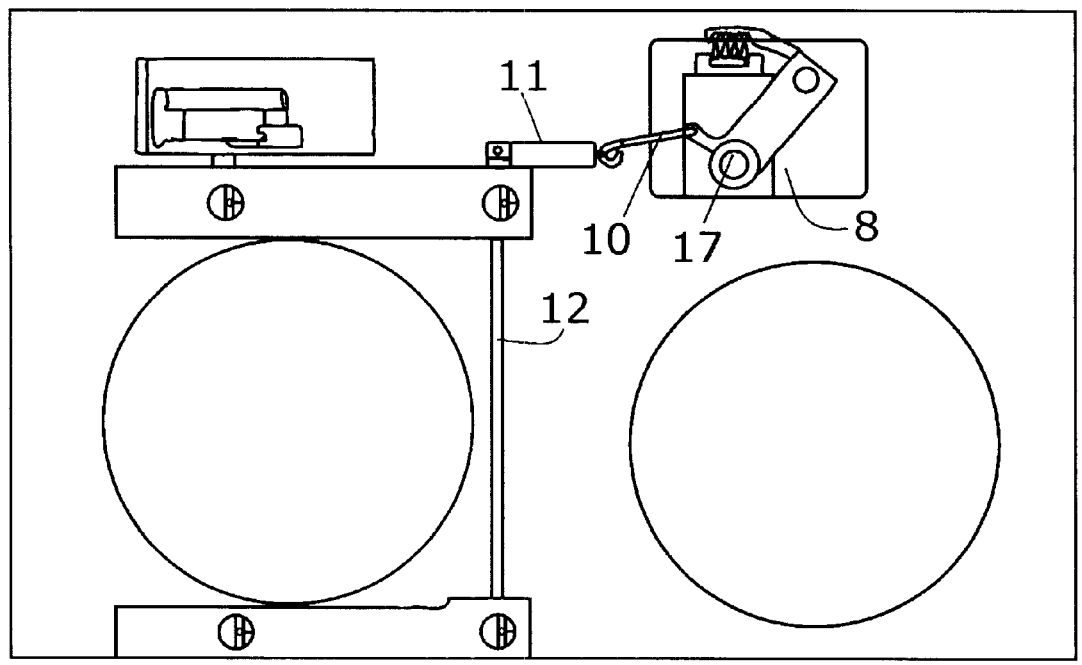

FIGS. 4, 5 and 6 show the progression during an unload cycle. In FIG. 4 the brush housing 8 in the resting position pivoted away from the head 7. Arrow D2 shows the direction in which the link 10 will move during an unload operation, while arrow D3 shows the direction of the movement of the brush housing 8. FIG. 5 shows the positions of the spring 11, of the link 10 and of the brush housing 8 halfway through the unload operation. In FIG. 6 the brush housing 8 has reached the final position and the brush 9 is now in contact with the head 7.

A load operation reverses the direction of operation. The shaft 12 rotates in counter-clockwise direction. The end of the arm 14 attached to the spring 10 pivots toward the back 2 of the tape drive. In turn the spring 11 and the rod 10 move in the same direction. The carrier 8 rotates around its pivot point 17 in such a way that the brush 9 is moved to the side of the head 7.

A second embodiment of the present invention is shown in FIGS. 7–12 to be used with a second type of tape drive.

Figure 7:
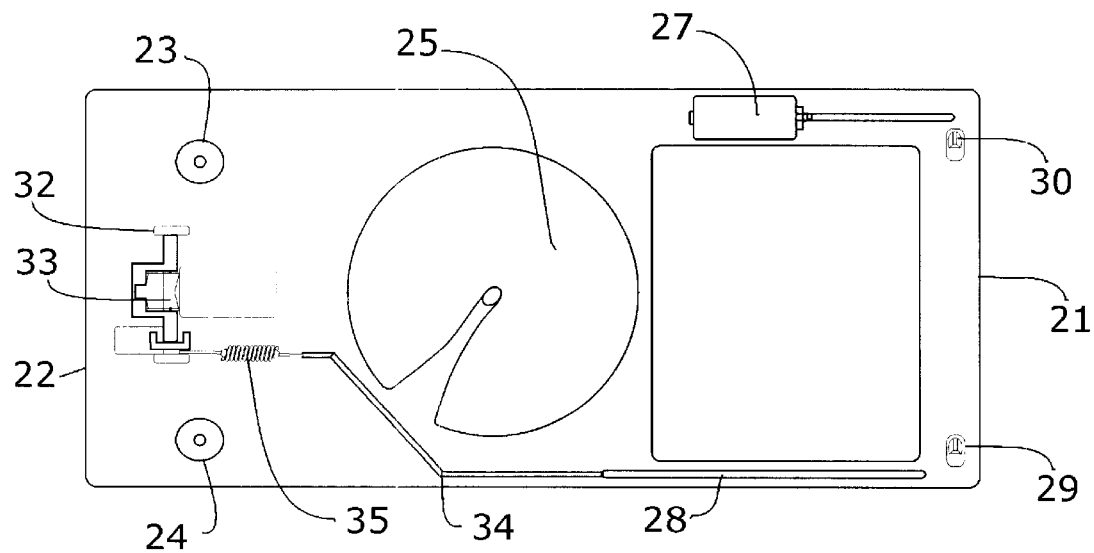
FIG. 7 is a top plan view of a second embodiment of the present invention.
Figure 8:
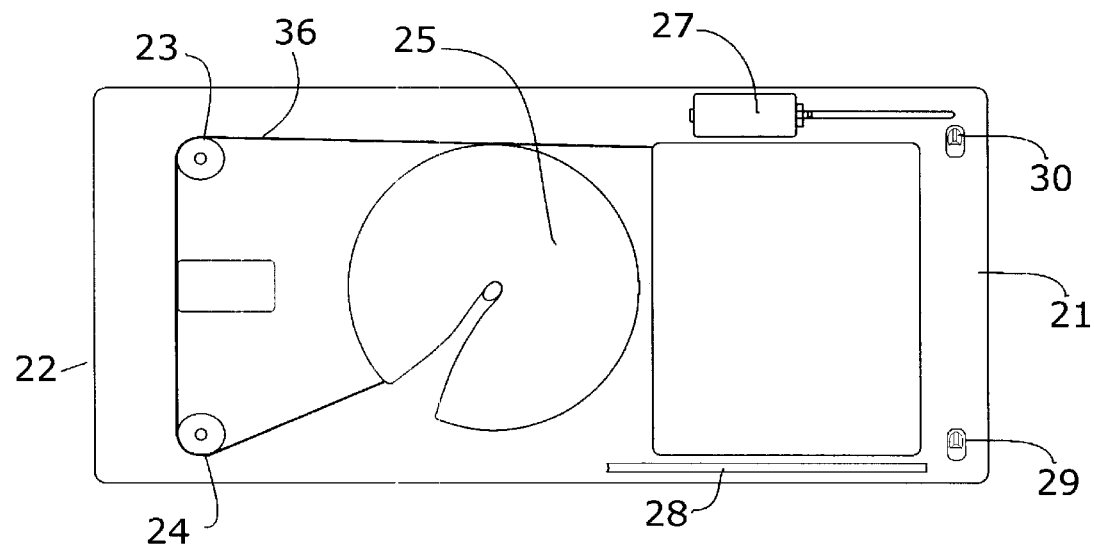
FIG. 8 is a top plan view of the tape being wound from the cartridge to the take-up reel in one type of drive.
Figure 9:
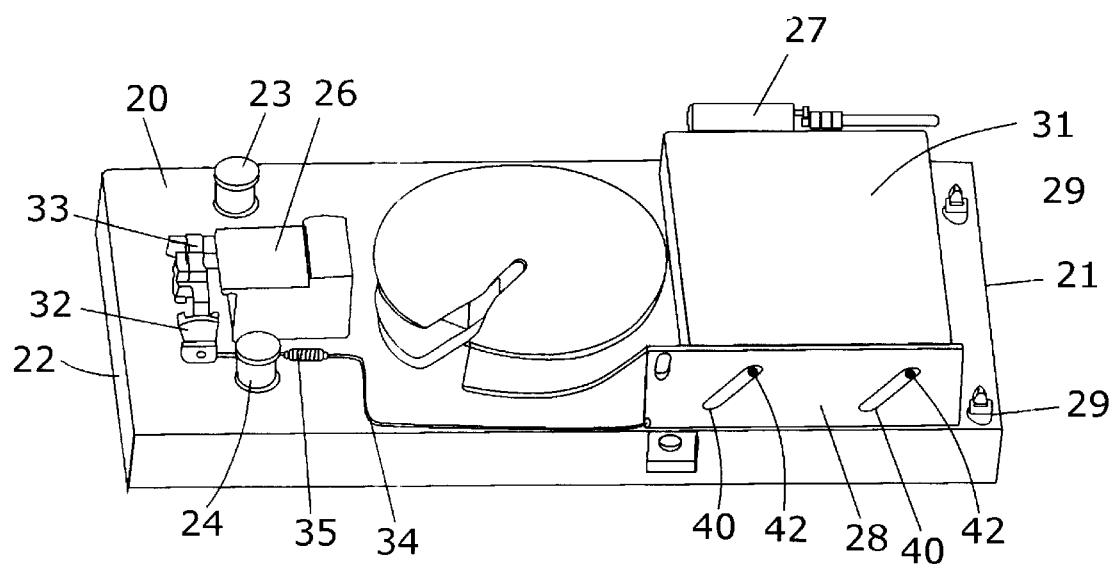
FIG. 9 is a top perspective view of the second embodiment of the present invention.

No embodiment of the present invention is preferred, the choice of embodiment is dictated by the set up of the tape drive the invention is to be used on. As shown in FIG. 8, the tape 36 is wound from the tape cartridge (not shown) inside the housing 31, around the roller guide 23, across the recording head 26, and around a second roller guide 24 onto a take-up hub 25, making up the tape receiving part of the tape drive. A base plate 20 is used to mount the drive components, as shown in FIGS. 7 and 9. The base plate 20 has a front 21 and a rear 22. Locating pins 29 and 30 define the cartridge height and position once it is loaded onto the drive. A brush housing 32 is pivotally mounted on the base plate 20. The brush housing 32 holds the brush 33. The rod 34 and the spring 35 both link the brush housing 23 mechanically to a cartridge housing side plate 28. In FIG. 9 only one of the two side plates is shown. The side plate on the opposing side of the housing 31 is not shown so that motor 27 is visible.

Housing 31 has two pins 42 on each side. The pins 42 are positioned through two diagonally oriented slots 40 in the side plates 28. Motor 27 moves side plates 28 towards the rear of the unit during an unload cycle to raise the cartridge housing 31 and towards the front of the unit during a load cycle to lower the cartridge housing 31.

FIGS. 7 and 9 show the position of the cartridge housing 31 when no cartridge is loaded onto the unit. During an unload cycle the cartridge housing 31 is raised by moving side plate 28 towards the rear of the unit. The rod 34, attached to the side plate 28, also moves towards the rear of the unit and causes the brush housing 32 to pivot towards the head 26. Once the brush housing 32 has reached the final position the spring 35 contracts and allows continued movement of the cartridge housing 31 until it also has reached its final position. The force of the spring 35 determines the force at which the brush 33 is held against the head 26.

Figure 10:
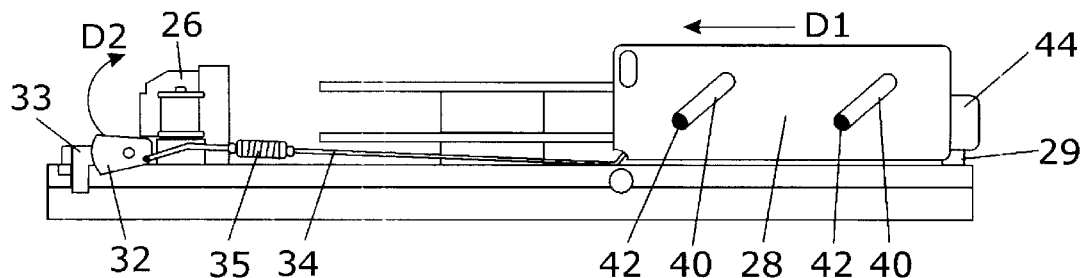
FIGS. 10, 11 and 12 are a top perspective view of the movement of the brush housing during an unload cycle for the second embodiment.
Figure 11:
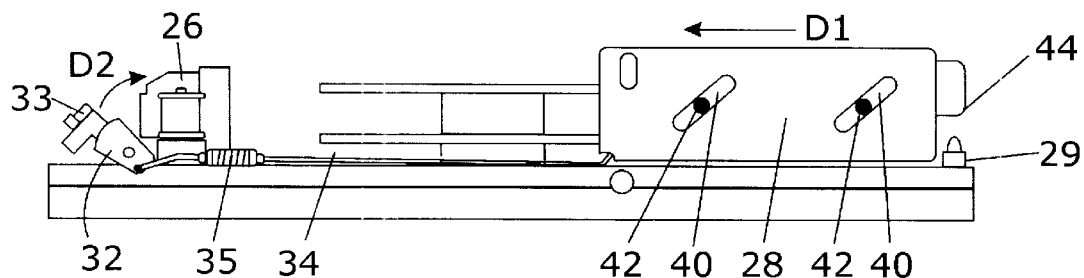
Figure 12:
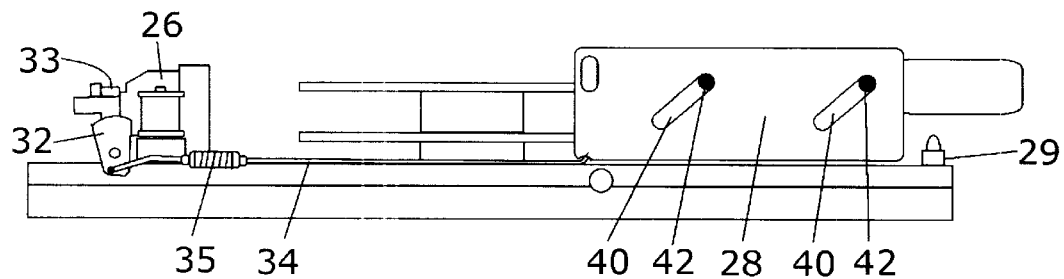

FIGS. 10, 11 and 12 show the progression during an unload cycle. In FIG. 10 the brush housing 33 is pivoted away from the head 26. The cartridge housing 31 is in the lower position. Cartridge 44 is located on pins 29 and 30. Now the side plate 28 is moved towards the rear of the unit as indicated by arrow D1 to raise the cartridge housing 31 and the cartridge 44. Rod 34 and also moves towards the rear of the unit and causes brush housing 32 to pivot as indicated by arrow D2. In FIGS. 11 and 12, the brush housing 32 pivots toward the head 26, and in FIG. 12 the brush 33 is in contact with the head 26.

As described in the first embodiment, the movement of the head 26 up and down against the brush 33 now performs the cleaning cycle. Again, the head actuator (not shown), which is normally used to access different areas of the tape, is now used to move the head 26 against the brush 33, performing the cleaning operation.

During a load cycle the movement of the components is reversed and the brush 33 is pivoted away from the head 26.

It is understood that there are different ways to construct a loading device and a link between the loading device and the cleaning device. What is important is that a mechanical link between the loading device and the cleaning device provides a method to actuate the cleaning device without the need of additional electrical circuits or actuators.

Although the present invention has been described with reference to specific embodiments, numerous modifications and variations can be made and still the result will come within the scope of the invention. No limitation with respect to the specific embodiments disclosed herein is intended or should be inferred.

We claim:

1. A mechanically actuated cleaning device for a tape drive, said cleaning device comprising:
   a receiver for a tape cartridge;
   a loading apparatus for the tape cartridge integral to the receiver;
   a recording head mounted to the receiver;
   a multi position support for a brush mounted near the recording head;
   a mechanical switch connecting the loading device and the multi position support;
   the mechanical switch further comprising;
      an arm moveably attached to the loading device;
      a rod attached to the multi position support;
      a spring attached between the arm and the rod; and
      whereby the brush is moved via the mechanical switch to a cleaning position in contact with the recording head when a cartridge is unloaded from the loading apparatus.

2. A mechanically actuated cleaning device for a tape drive, said cleaning device comprising:
   a receiver for a tape cartridge;
   a loading device for the tape cartridge integral to the receiver;
   a recording head mounted to the receiver;
   a multi position support for a brush mounted near the recording head;
   a mechanical switch connecting the loading device and the multi position support;
   the mechanical switch further comprising;
      a rod attached to the loading device;
      a spring attached between the rod and the multi position support; and
      whereby the brush is moved via the mechanical switch to a cleaning position in contact with the recording head when a cartridge is unloaded from the loading device.

3. A mechanically actuated cleaning device for a tape drive, said cleaning device comprising:
   a receiver for a tape cartridge;
   a loading apparatus for the tape cartridge integral to the receiver;
   a recording head mounted to the receiver;
   a multi position support for a brush mounted near the recording head;
   a mechanical switch connecting the loading device and the multi position support;
   whereby the brush is moved via the mechanical switch to a cleaning position in contact with the recording head when a cartridge is unloaded from the loading apparatus,
   said recording head mounted on an actuator having a motor to move the head across the brush to perform a cleaning cycle
   a control apparatus attached to the actuator, and
   said control apparatus having a counter to count the number of recording errors and a selector to select an appropriate number of cleaning cycles based on the number of counted recording errors.

4. A method of cleaning a recording head of a tape drive comprising the steps of:
   mounting the recording head on an actuator having an oscillatory function to move the recording head;

pivotally attaching a brush to the tape drive;

attaching the brush to a loading device for a tape cartridge, whereby the brush will move to a cleaning mode comprising the brush contacting the recording head when the loading device unloads a tape cartridge;

performing a cleaning cycle by activating the actuator, thereby moving the recording head across the brush;

attaching a control apparatus to the actuator, said control apparatus functioning to count the number of recording errors;

selecting a number of cleaning cycles based on the number of recording errors; and activating the head actuator to perform the selected number of cleaning cycles.

5. A tape drive comprising:

a recording head configured to read information from a data tape that is received by the tape drive;

a tape carrier configured to load the data tape into association with the recording head;

a cleaning device attached to said tape carrier;

said cleaning device having an engagement assembly to engage a brush against the recording head when the data tape is unloaded;

said recording head mounted on an actuator having a motor to move the recording head across the brush to perform a cleaning cycle;

a control apparatus attached to the actuator, and said control apparatus having a counter to count the number of recording errors and a selector to select an appropriate number of cleaning cycles based on the number of counted recording errors.

6. A tape drive comprising:

a recording head configured to read information from a data tape that is received by the tape drive;

a tape carrier configured to load the data tape into association with the recording head;

a cleaning device attached to said tape carrier;

said cleaning device having an engagement assembly to engage a brush against the recording head when the data tape is unloaded;

said recording head mounted on an actuator having a motor to move the recording head across the brush to perform a cleaning cycle;

said engagement assembly further comprising;
an arm moveably attached to the tape carrier;
a rod attached to the cleaning device; and
a spring attached between the arm and the rod.

7. A tape drive comprising:

a recording head configured to read information from a data tape that is received by the tape drive;

a tape carrier configured to load the data tape into association with the recording head;

a cleaning device attached to said tape carrier;

said cleaning device having an engagement assembly to engage a brush against the recording head when the data tape is unloaded;

said recording head mounted on an actuator having a motor to move the recording head across the brush to perform a cleaning cycle;

said engagement assembly further comprising;
a rod attached to the tape carrier; and
a spring attached between the rod the cleaning device.

8. In a tape drive having: a loading apparatus for a tape cartridge, a take up spool, spool motors, guides forming a tape path, a recording head mounted on an actuator in relation to the tape path, all mounted on a base plate, the improvement which comprises:

a brush pivotally mounted near the recording head;

a mechanical link attaching the brush to the loading apparatus, said link having at least two positions to move the brush from a rest position when a tape cartridge is in the loading apparatus to a cleaning position with the brush against the recording head when the tape is unloaded;

said mechanical link further comprising;
an arm moveably attached to the loading apparatus;
a rod attached to the brush; and
a spring attached between the arm and the rod.

9. In a tape drive having: a loading apparatus for a tape cartridge, a take up spool, spool motors, guides forming a tape path, a recording head mounted on an actuator in relation to the tape path, all mounted on a base plate, the improvement which comprises:

a brush pivotally mounted near the recording head;

a mechanical link attaching the brush to the loading apparatus, said link having at least two positions to move the brush from a rest position when a tape cartridge is in the loading apparatus to a cleaning position with the brush against the recording head when the tape is unloaded;

said mechanical link further comprising;
a rod attached to the loading apparatus; and
a spring attached between the rod the brush.

10. In a tape drive having: a loading apparatus for a tape cartridge, a take up spool, spool motors, guides forming a tape path, a recording head mounted on an actuator in relation to the tape path, all mounted on a base plate, the improvement which comprises:

a brush pivotally mounted near the recording head;

a mechanical link attaching the brush to the loading apparatus, said link having at least two positions to move the brush from a rest position when a tape cartridge is in the loading apparatus to a cleaning position with the brush against the recording head when the tape is unloaded;

wherein the actuator moves the recording head across the brush to perform a cleaning cycle;

a control apparatus attached to the actuator, said control apparatus having a counter to count the number of recording errors and a selector to select an appropriate number of cleaning cycles based on the number of counted recording errors.

* * * * *